United States Patent [19]

Stritzel

[11] Patent Number: 4,491,036

[45] Date of Patent: Jan. 1, 1985

[54] DIFFERENTIAL ASSEMBLY HAVING MEANS FOR ACCOMMODATING ANGULAR MISALIGNMENTS OF AXLE SEGMENTS

[75] Inventor: Gene A. Stritzel, Rochester, N.Y.

[73] Assignee: The Gleason Works, Rochester, N.Y.

[21] Appl. No.: 475,575

[22] Filed: Mar. 15, 1983

[51] Int. Cl.$^3$ ............................................. F16H 1/38
[52] U.S. Cl. ........................................... 74/715; 74/710
[58] Field of Search ............... 29/434; 74/710, 710.5, 74/711, 713, 714, 715

[56] References Cited

U.S. PATENT DOCUMENTS

| | | | |
|---|---|---|---|
| 1,874,646 | 8/1932 | Skinner | 74/713 X |
| 2,070,569 | 2/1937 | Asam | 74/715 |
| 2,203,683 | 6/1940 | Frederickson | 74/715 |
| 2,230,338 | 2/1941 | Shaw | 74/714 X |
| 2,651,215 | 9/1953 | Schoenrock | 74/714 X |
| 2,720,796 | 10/1955 | Schou | 74/711 |
| 2,855,805 | 10/1958 | Fallon | 74/711 |
| 2,859,641 | 11/1958 | Gleasman | 74/715 |
| 2,972,265 | 2/1961 | Walter | 74/714 X |
| 3,008,350 | 11/1961 | Misener | 74/710.5 |
| 3,057,226 | 10/1962 | Blomberg | 74/713 |
| 3,237,483 | 3/1966 | Kelley et al. | 74/715 |
| 3,375,736 | 4/1968 | Saari | 74/711 |
| 3,400,611 | 5/1968 | Engle | 74/710.5 |
| 3,494,226 | 10/1970 | Biddle | 74/711 |
| 3,527,120 | 9/1970 | Duer et al. | 74/711 |
| 3,706,239 | 12/1972 | Myers | 74/715 |
| 3,735,647 | 5/1973 | Gleasman | 74/715 |
| 3,849,862 | 11/1974 | Benjamin | 74/715 X |
| 3,874,250 | 4/1975 | Duer et al. | 74/711 |
| 3,875,824 | 4/1975 | Benjamin | 74/715 |
| 3,884,096 | 5/1975 | Gleasman | 74/715 |
| 3,893,351 | 7/1975 | Baremor | 74/710.5 |
| 3,902,237 | 9/1975 | Benjamin | 74/715 |
| 3,930,424 | 1/1976 | Myers, Sr. | 74/711 |
| 4,037,492 | 7/1977 | Ashauer et al. | 74/713 X |
| 4,162,637 | 7/1979 | Altmann | 74/711 |
| 4,191,071 | 3/1980 | Gleasman et al. | 74/715 X |
| 4,245,525 | 1/1981 | LeBegue | 74/711 |
| 4,269,086 | 5/1981 | Altmann | 74/710.5 X |
| 4,365,524 | 12/1982 | Dissett et al. | 74/715 |

OTHER PUBLICATIONS

Gleason Drafting Print 81TT-4026-AA, Dec. 7, 1977.

Primary Examiner—Allan D. Herrmann
Assistant Examiner—Stephen B. Andrews
Attorney, Agent, or Firm—Ralph E. Harper; Morton A. Polster

[57] ABSTRACT

A differential assembly (10) having worm gears (26, 28) as drive gears together with transfer gears (30, 32) operatively connected to the drive gears is provided with spherical mounting surfaces (40) and a washer element (42) for accommodating angular displacement of axle segments (12) and (14) relative to the differential assembly. In addition, a spacing member (50) is provided with a convex spherical surface (52) for accommodating angular movement of the axle segments.

6 Claims, 5 Drawing Figures

DIFFERENTIAL ASSEMBLY HAVING MEANS FOR ACCOMMODATING ANGULAR MISALIGNMENTS OF AXLE SEGMENTS

TECHNICAL FIELD

The present invention relates generally to differential assemblies for use in dividing and interlocking driving action from a drive train to separate axle shafts which are connected to the differential assembly. More specifically, the invention is concerned with an improved means for accommodating angular misalignments of a pair of axle segments relative to a common axis passing through the differential assembly.

BACKGROUND ART

It is known in the art of designing drive trains for motor vehicles, such as automobiles and trucks, to provide for differential action between driving wheels carried at opposite ends of an axle assembly of the vehicle. Typically, the axle is divided into two segments with inner ends of the separate axle segments splined to drive gears contained within a differential assembly. Conventional differential assemblies of the type commonly used on motor vehicles include two bevel drive gears carried within the differential assembly and mounted on splines formed on the ends of the axle segments which are inserted into the assembly.

Generally, the two axle segments of a differential are aligned on a common center axis of rotation, however, some manufacturers prefer to build in a slight misalignment or "camber" for their axle assemblies. Where it is desirable to provide for slight angular misalignments of the axle segments relative to a common center axis therebetween, it has been the practice, with conventional differential designs, to provide for a clearance between the ends of the axle parts and the housing of the differential assembly so that a certain amount of flexing of the axle ends can be attained.

In contrast with conventional differential assemblies, the differential assembly which is the subject of this invention is of a type that does not utilize bevel gears and is generally of the design shown in U.S. Pat. No. 2,859,641 of Nov. 11, 1958 in the name of Gleasman. This patent is incorporated herein by reference to the extent necessary to provide specific details of a type of differential assembly which does not utilize bevel gears. The patent discloses a mechanism termed a "cross axis compound planetary gear complex". This type of differential includes worm gears, coupled to each axle end as drive gears, together with so called "balancing" or transfer gears associated with each of the worm drive gears and in mesh with each other for transferring and dividing torque between the axle ends. The transfer gears are mounted in pairs, and each transfer gear of a pair rotates on an axis of rotation that is substantially tangental to the pitch of an associated axle drive gear.

One approach for accommodating angular misalignments of axle segments has been to simply provide sufficient space around the ends of the axle segments where they enter the differential assembly to permit a flexing of the axle segments to whatever mounted position is desired for a given axle design. With this arrangement, the bevel drive gears which are carried on the innermost ends of the axle segments are simply tilted slightly with the angular displacement of the turning axes of associated axle segments, and this slight tilt of the drive gears requires some modification of the tooth geometry of the individual drive gears so that they mesh correctly with associated bevel transfer gears within the differential assembly.

In addition to providing for specific means for accommodating angular misalignments of axle segments in a differential having worm-type driving gears, the present invention also solves a problem with respect to providing for a better centering and positioning of each axle segment relative to a differential housing through the use of geometric structures within the housing to accommodate and fix the positions of the axle segments. In addition, it is necessary to consider the effect of angular misalignments of axle segments on any spacer or thrust member which may be positioned between the innermost ends of the axle segments contained within a differential assembly. Accordingly, the present invention provides for a specific geometric relationship between the axle ends and any such spacer member that may be included within the assembly.

DISCLOSURE OF THE INVENTION

The present invention is concerned with specific improvements for the Gleasman type of differential assembly discussed above which does not utilize bevel gears as drive gears and which is designed to accommodate slight axle deflections or misalignments of axle segments relative to the differential assembly. Specifically, the invention provides for a special geometry for certain internal bearing surfaces formed within the housing of the differential assembly together with preferred geometry for a spacing member which is included between the axle ends within the assembly.

In order to provide for slight angular misalignment of axle segments in the Gleasman type of differential assembly, it is necessary to modify the seating of the worm drive gears associated therewith so that each axle segment can be separately deflected slightly to provide a preferred camber to the overall axle design, or to provide some other accommodation of load or movement of the axle assembly. In a preferred embodiment of the invention, spherical mounting surfaces are formed within the differential housing for receiving mating bearing surfaces associated with each drive gear carried at the end of each of the axle segments. The spherical mounting surfaces formed within the differential case are slightly concave so as to receive convex surfaces formed on the bearing faces of associated drive gears when the drive gears are secured to the end of an axle segment carried within the housing. Through the use of such spherical mounting surfaces, it is possible to tilt or adjust each axle segment slightly in a first plane while maintaining a substantially centered condition for the axle segment in a second plane which is at right angles to the first plane. The spherical mounting surfaces are designed to accommodate a slight angular movement of each axle end about an imaginary pivot point which falls approximately at the innermost end of each axle segment.

In addition to accommodating slight deflections of each axle segment through the use of spherical mounting surfaces formed between the drive gears and the differential case itself, it is also a feature of the present invention that a spacing member installed between the ends of the axle segments is designed to likewise accommodate slight displacements of the axle ends about an imaginary pivot point. The spacing member is of a known type which can be removably installed between the axle ends so as to define a predetermined spacing between the axle segments and to act as a thrust member which limits inward movement of the axle members. Various designs exist for such spacing members, including designs which make up the spacing member from a number of sub-components such as described in my copending application Ser. No. 475,574 entitled "Differential Assembly having Means for Locking and Positioning Axle Shafts Therein", filed even date herewith or as described, for example, in U.S. Pat. No. 4,365,524. In accordance with the present invention, the spacing member is provided with opposed convex spherical surfaces for bearing against concave spherical surfaces formed on opposing faces of the drive gears associated with each of the axle segments. Specific designs are provided for spacing members which are assembled from a number of sub-components for ease of installation and removal relative to the differential assembly.

These and other features and advantages of the invention will become apparent in the more detailed discussion which follows. In that discussion, reference will be made to the accompanying drawings as briefly described below.

A BRIEF DESCRIPTION OF DRAWINGS

DETAILED DESCRIPTION OF THE INVENTION

Figure 1:
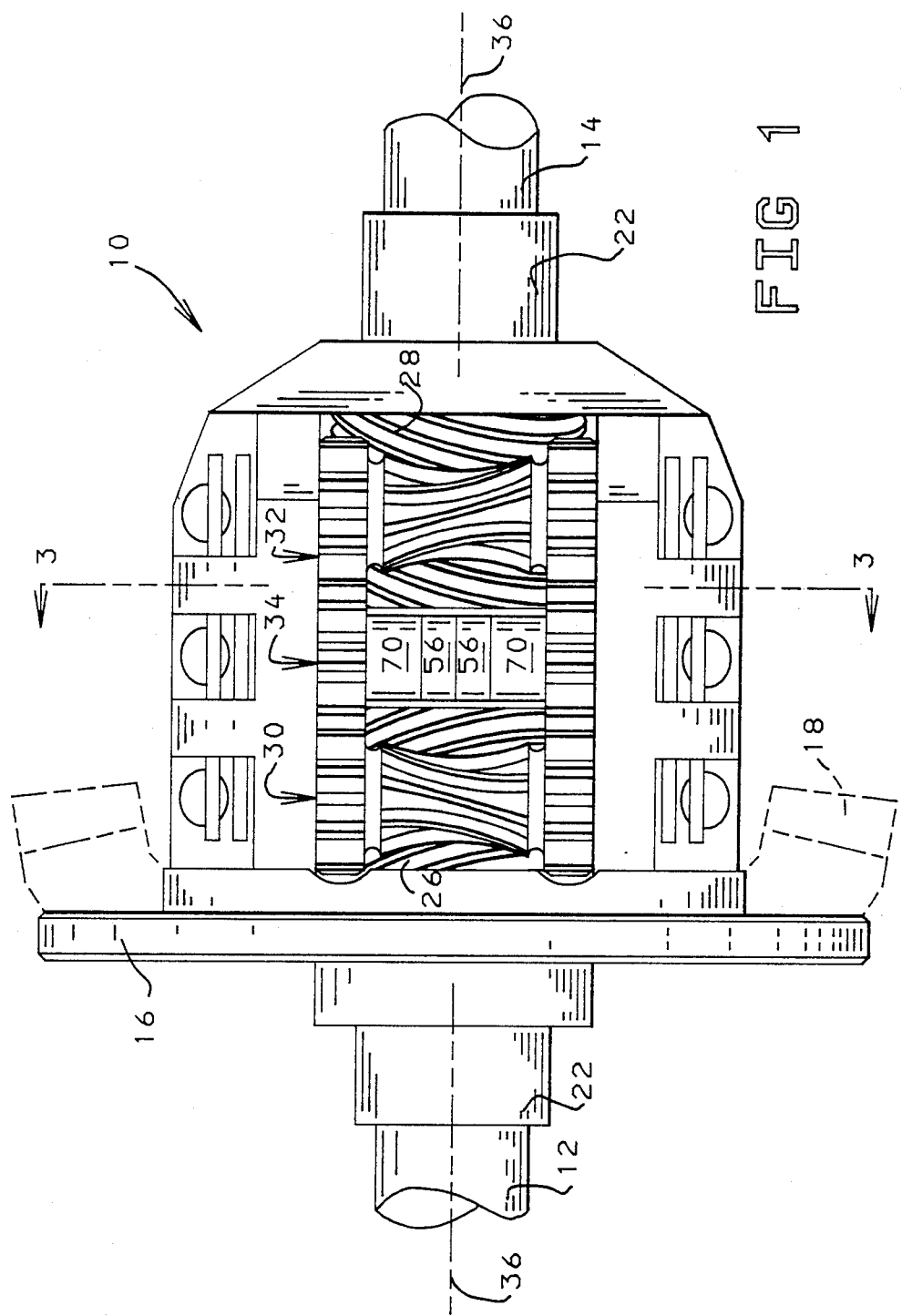
FIG. 1 is an elevational view of a type of differential assembly contemplated for use with the present invention.

Referring to FIGS. 1 through 4, the differential assembly 10 of the invention is illustrated as comprising a differential case or housing formed as a unitary structure for carrying a number of gear components together with axle segments 12 and 14 of an axle assembly for a vehicle. The housing for the differential assembly 10 includes a flange 16 formed thereon for receiving a conventional ring gear 18 (shown in phantom) of a main drive train of a motor vehicle. In fabricating the housing, any known method of fabrication may be utilzied, including building up of the housing from separate units, but in the illustrated embodiments, the housing is cast as a single unitary structure. In such a construction, major openings 20 are formed through the cast housing to define a relatively open interior space for receiving inner ends of the axle segments 12 and 14 together with associated gear components. Opposite ends of the housing include journals 22 which define bores into which the ends of the axle segments 12 and 14 are inserted.

Figure 2:
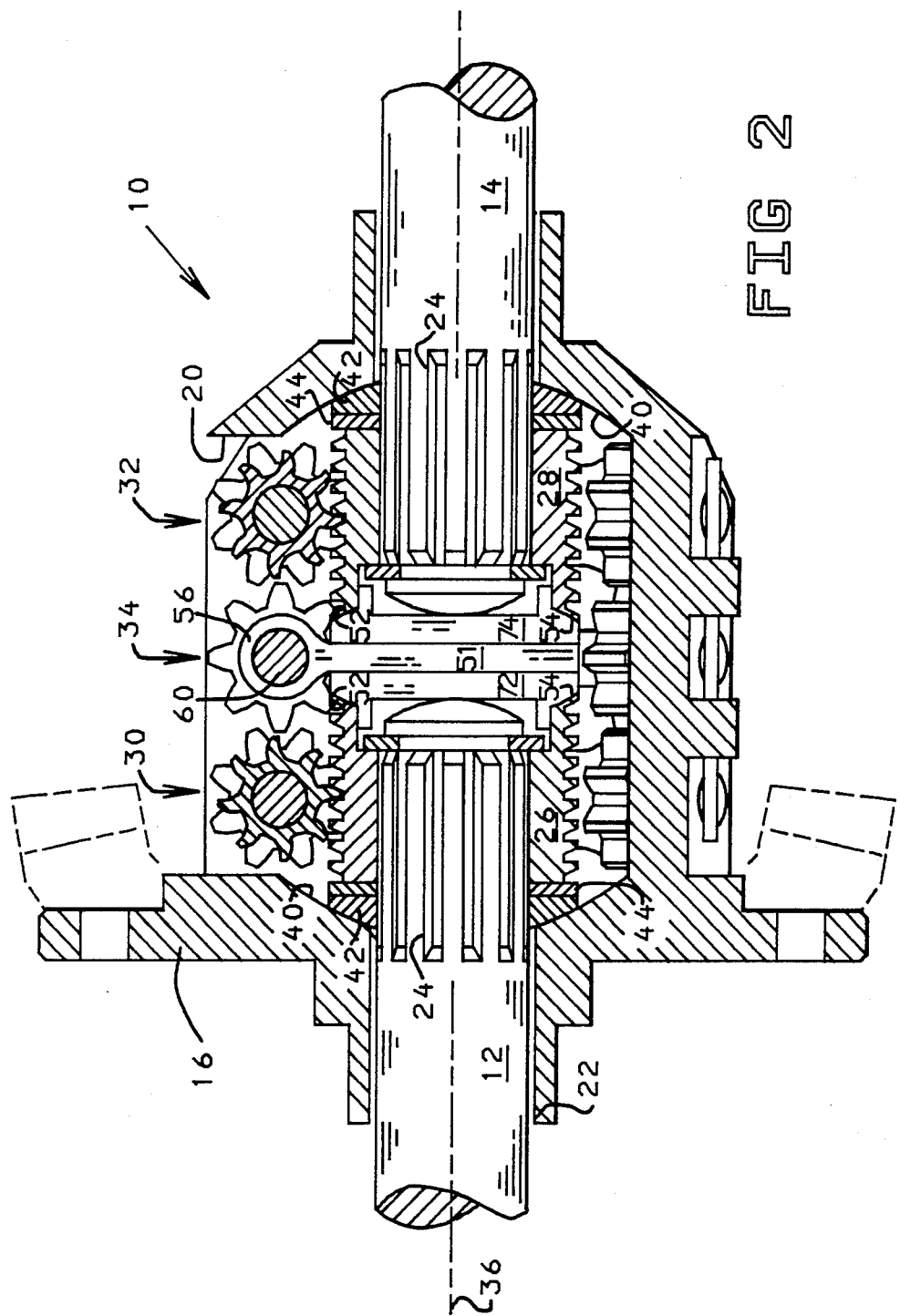
FIG. 2 is a sectional view of the differential assembly of FIG. 1, as seen on line 2—2 of FIG. 3.
Figure 4:
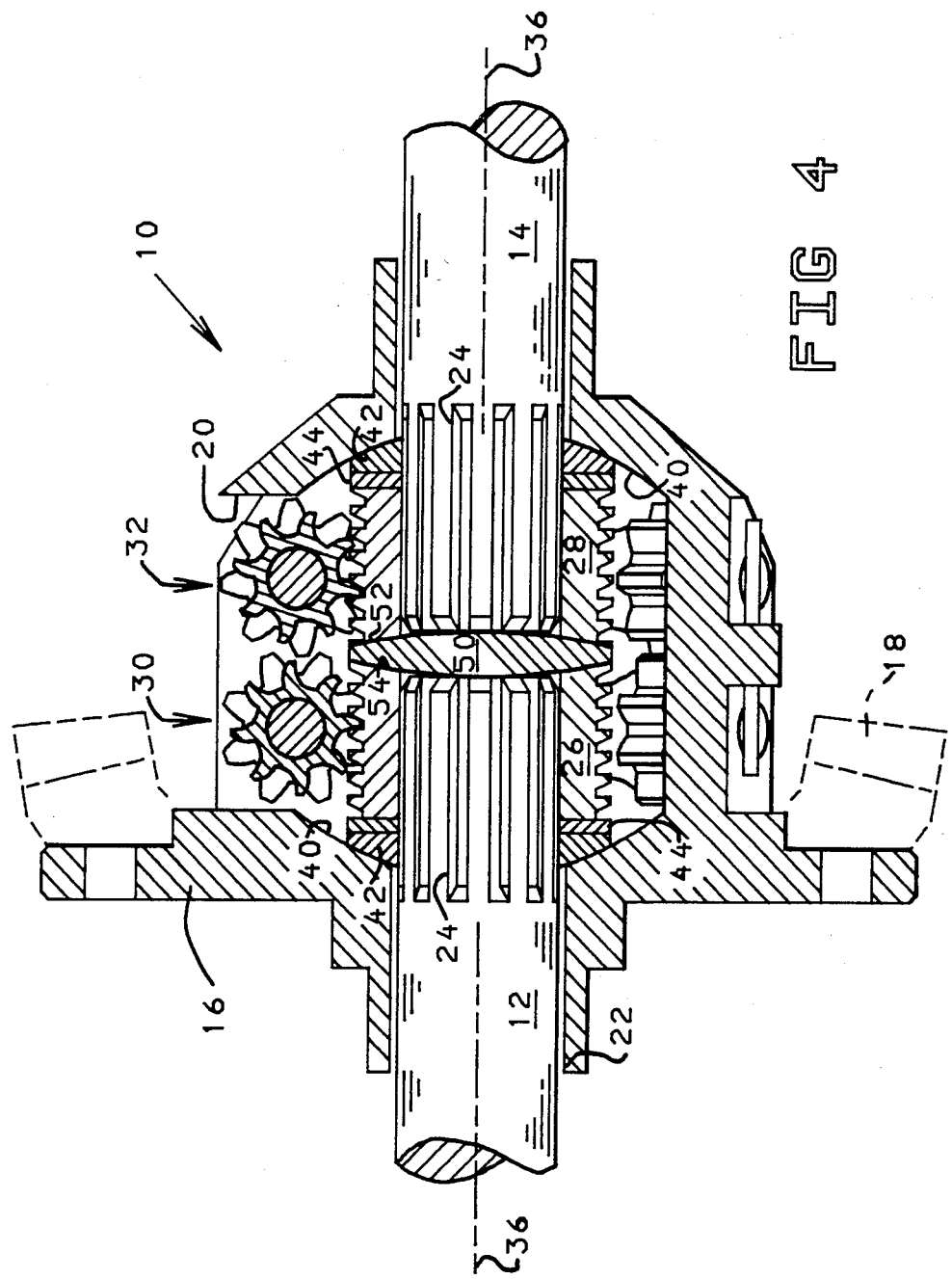
FIG. 4 is a sectional view of another embodiment of a differential assembly of this invention, showing a different form of spacing member for use therewith.

As shown in FIGS. 2 and 4, the innermost ends of the axle segments 12 and 14 are provided with splines 24, as is known in the art, for securing separate drive gears 26 and 28 to the axle ends. The illustrated drive gears are preferrably in the form of worm gears, as disclosed in the aforesaid U.S. Pat. No. 2,859,641 for meshing with worm wheel portions of transfer gears 30 and 32 respectively associated with the drive gears 26 and 28.

As is known in this art, the transfer gears 30 and 32 each include a central worm wheel portion for meshing with the worm teeth of an associated drive gear. In addition, each transfer gear 30 and 32 is provided with spur gears formed (or secured) at each end thereof for transmitting motion of one of the transfer gears to an opposite end of the differential to the other of the transfer gears. FIG. 4 illustrates an embodiment of the invention in which transfer gears 30 and 32 are in meshing engagement with each other so that relative motions within the differential assembly can be divided between the two axle segments 12 and 14. FIGS. 1 though 3 represent a somewhat different embodiment of the invention wherein intermediate transfer gears 34 are provided for operatively connecting the transfer gears 30 and 32. Each intermediate transfer gear 34 functions simply to mesh with the spur gear portions of the transfer gears 30 and 32 and to provide for easier access to the interior of the housing when the intermediate gear 34 is removed. Such an arrangement is preferably used where the axle ends 12 and 14 are of a type which must be locked with C-shaped fasteners, or similar devices, at their innermost ends within the differential assembly. With such arrangements, it is necessary to obtain access to the interior of the differential housing for placing C-shaped fasteners on the ends of axle segments which have been asserted into the housing.

Although the axle segments of FIGS. 1, 2 and 4 are shown as being aligned on a common axis of rotation 36, it is to be understood that there are certain designs of axles which require a slight angular misalignment of each axle segment relative to such a common axis of rotation. For example, in the orientation shown for FIGS. 1, 2 and 4, it may be required to place the outer ends of the axle segments 12 and 14 in slightly downward positions so that their separate axes of rotation will be angled downwardly from the common axis 36. This angular displacement takes place about an imaginary pivot point which would fall approximately in the center of the space between the innermost ends of the two axle segments within the differential assembly. This type of angular displacement may be considered as taking place within a vertical plane which passes through the common axis 36.

In order to accommodate such angular displacements and to provide for a precise positioning of each axle segment relative to the differential assembly and the gears contained therein, special mounting surfaces 40 are formed within the differential housing for receiving corresponding bearing surfaces associated with each of the drive gears 26 and 28. In the illustrated embodiment, each drive gear 26 and 28 is mounted against a washer element 44, which in turn is mounted against a washer element 42 having a convex surface formed on an outer face thereof for bearing against the mounting surface 40 formed within the differential case. Generally, the mounting surfaces 40 may be considered as concave spherical surfaces which are designed to slidably receive convex spherical surfaces formed on the washer elements 42. It can be seen that the curvatures of the mating surfaces are relatively large since very little accommodation is required for displacement of the axle segments carried within the differential assembly. The flat washers 44 are utilized for providing full support and backing for the spherical washer elements 42 relative to the separate drive gears 26 and 28 upon which they are mounted. For this purpose, each drive gear 26 and 28 is provided with a reduced diameter end portion which is dimensioned and shaped to receive the two washers 42 and 44, as illustrated. With this arrangement, it is possible to provide for the type of angular displacement discussed above in which an axle segment may be displaced in a vertical plane passing through the common axis 36 and about an imaginary pivot falling at a midpoint in the differential assembly between the two opposing axle ends. While displacement is taking place in such a vertical plane, it can be appreciated that the spherical mounting surface 40 and the spherical bearing surface of the washer 42 serve to maintain the axle segment in a substantially centered condition relative to an opposing plane which is perpendicular to the vertical plane in which displacement is taking place. Likewise, the axle segments can be moved in any other plane relative to the remainder of the differential assembly and similar centering action will take place in a plane perpendicular thereto.

In the FIG. 4 embodiment, a relatively simple, disc-shaped, spacing member 50 is shown in its installed position between the axle segments 12 and 14 of the differential assembly. The spacing member 50 functions to set the axle segments in a preferred spaced relationship and to prevent inward movement of the axle segments from their preset positions. In accordance with a further feature of this invention, the spacing member 50 is also provided with a convex spherical surface 52 for bearing against a corresponding concave spherical surface 54 formed at an inner end of an associated drive gear 26 or 28. In this manner, further control of axle deflection and centering can be offered by the components which are assembled at the ends of the opposing axles.

As already discussed, the embodiment of FIGS. 1 though 3 involves the use of an intermediate transfer gear 34 for providing an easily removable element which gives access to the center portion of the differential assembly. This arrangement is particularly useful for axle assemblies which require the installation of locking members at the ends of each axle segment after the axle segments have been inserted into the differential assembly. In this arrangement, a relatively more complex spacing member 50 (see also FIG. 5) is provided for insertion between the innermost ends of the axle. Such a spacing member is described in my co-pending application identified above and includes a projecting mounting element 56 having a bore 58 therethrough for receiving a journal pin 60 (FIG. 2) upon which an intermediate transfer gear 34 is mounted. Such an arrangement provides for a positive fixing of the spacing member 50 in its correct position within the housing and yet permits easy removal therefrom when the intermediate gear 34 is removed from its installed position. Removal of the gear 34 is accomplished by removing its journal pin 60. As with the spacing member 50 of the FIG. 4 embodiment, the spacing member 50 of FIGS. 1-3 includes specially formed spherical surfaces 52 for matching corresponding surfaces 54 of associated drive gears 26 and 28. In a preferred embodiment, the surfaces 52 are formed on separate elements of the spacing member 50 which are separately removable from the differential housing after a central element 51 has been removed therefrom.

Figure 3:
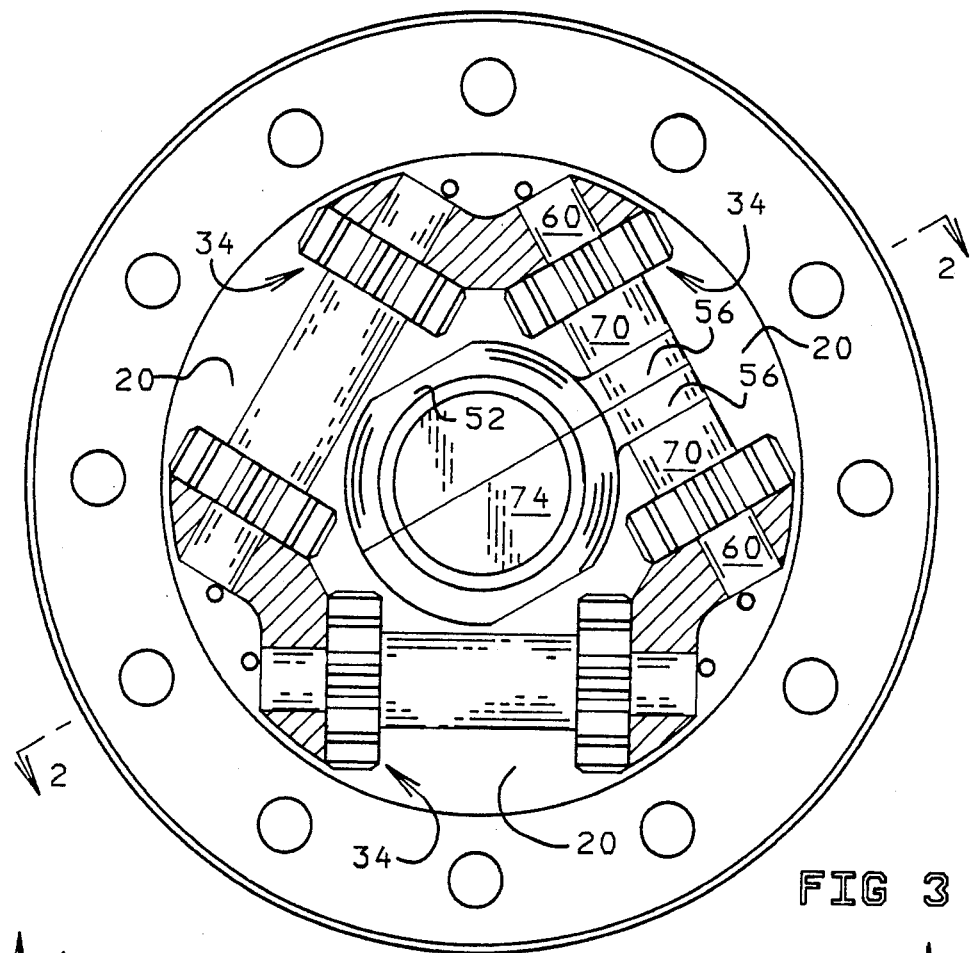
FIG. 3 is a sectional view of the differential assembly of FIG. 1, as seen on line 3—3 thereof.
Figure 5:
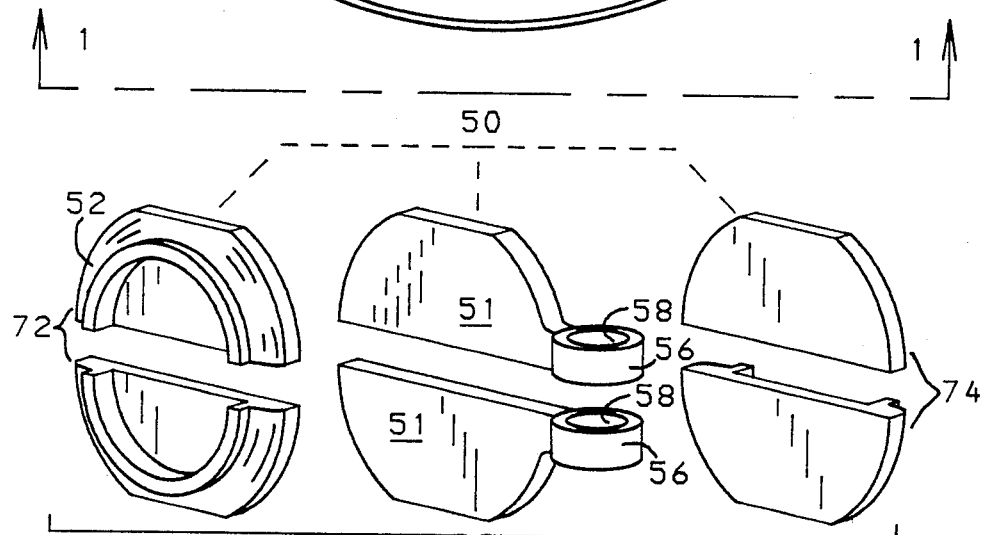
FIG. 5 is an exploded view of a preferred spacing member assembly for use with the differential assembly shown in FIGS. 1-3.

Although the spacing member 50 of FIGS. 1-3 has been referred to as if it were a single member, it is to be understood that the spacing member may take on many shapes and forms other than a unitary construction and may include the additional elements illustrated in FIG. 5. In the FIG. 5 arrangement, the spacing member 50 is shown as being made up of two sets of components which are formed as a result of breaking or splitting the spacing member 50 in a plane which generally passes through the common axis 36 of the differential assembly. By dividing the spacing member into two parts, the separate components are more easily inserted and removed from the confined interior of the differential assembly. As illustrated, the divided components which make up the spacing member 50 are designed so that each carries one half of the mounting element 56, and thus, when the two elements are assembled together, the journal pin 60 can function as a securing means for holding the spacing member in a preferred position within the interior of the differential assembly. Once the spacing member 50 is assembled and inserted in place, the position defined for it is at an approximate midpoint between the two axle ends, as shown in FIG. 2. As shown in FIG. 1, separate sleeves 70 are carried on the journal pin for defining the position of the mounting element 56.

Additional disc-shaped spacing elements 72 and 74 are included with the preferred spacing member of this invention for defining cup-shaped faces which embrace the ends of associated axles and which serve to retain locking rings in their locking positions on the axle ends. These cup-shaped faces are formed as separate disc-shaped elements 72 and 74 which are themselves split into two separate parts, as illustrated, for ease of installation and removal of the various components. Alternatively, each of the disc-shaped elements 72 and 74 may be formed as a unitary structure, provided the main spacing number 51 is designed to be easily removed prior to removal of the elements 72 and 74. Either way, the requirement is to provide a sufficient thickness of material to maintain the respective axle ends in their outwardly directed positions so that they cannot move inwardly toward the interior of the differential assembly during normal operation of the vehicle.

Another way of describing the spacing member of FIG. 5 is with reference to various axes set for components included within the differential assembly. Thus, the radially projecting mounting element 56 of the spacing member 50 can be described as having a bore 58 which has a center axis that is positioned at a right angle to, and offset from, the common center axis 36 of the axle segments 12 and 14. The center axis of the bore 58 is also a center axis of the journal pin 60 which is inserted through the bore for securing the spacing member 50 in its preferred position. Likewise, the plane in which the components of the spacing member are split (as shown in FIG. 5) can be described as being perpendicular to the axis of the bore 58.

Although this invention has been described with reference to specific embodiments thereof, it can be appreciated that variations in design, dimensions, and geometry can be made in the basic concepts which have been disclosed. All such variations as would be obvious to a person skilled in this art, or which would be equivalent to those described herein, are intended to be included within the scope of the claims which follow.

What is claimed is:

1. In a differential assemby of the type which includes a differential case having means for receiving a pair of axle ends together with a pair of worm gears coupled to said pair of axle ends for rotation therewith, and including at least one transfer gear in meshing engagement with each of said worm gears, with said transfer gears being operatively connected with each other for transferring drive between said pair of worm gears and their associated axle ends, said differential assembly being characterized by means for accommodating angular misalignments of said axle ends from a common center axis, said means comprising spherical mounting surfaces formed within said differential case for receiving spherical bearing surfaces associated with said pair of worm gears such that axle ends can be mounted in positions which are pivoted slightly out of a common axis so as to provide a camber or caster to wheels carried at outer ends of said axles, and including a spacing means which can be removably installed between said axle ends so as to define a predetermined spacing between the axle ends, said spacing means having opposed convex spherical surfaces for bearing against corresponding concave spherical surfaces formed on opposing ends of said worm gears.

2. The improvement of claim 1 wherein said differential assembly is of the type which includes an intermediate transfer gear in driving engagement with said transfer gears which are in meshing engagement with said pair of worm gears, and wherein said spacing means includes a mounting element projecting radially outwardly therefrom for securing the spacing means between said axle ends.

3. The improvement of claim 1 wherein said spacing means includes an inner disc-shaped member and two outer disc-shaped members, said inner disc-shaped member having a mounting element projecting radially outwardly therefrom for securing the inner disc-shaped member in its installed position between said axle ends, and said outer disc-shaped members being further shaped to embrace an associated axle end to thereby contain locking rings carried by said axle ends.

4. The improvement of claim 2 wherein all of the members of said spacing means are split in a plane which generally passes through the common center axis of said axle ends so as too provide separate pieces which can be easily removed from or installed into said differential case.

5. The improvement of claim 2 wherein said mounting element includes a bore therethrough for receiving a pin which secures said mounting element to said differential case.

6. The improvement of claim 5 wherein said pin comprises a journal pin that also carries said intermediate transfer gear.

* * * * *

UNITED STATES PATENT OFFICE
CERTIFICATE OF CORRECTION

PATENT NO. : 4,491,036

DATED : January 1, 1985

INVENTOR(S) : Gene A. Stritzel

It is certified that error appears in the above-identified patent and that said Letters Patent are hereby corrected as shown below:

In column 3, line 51, delete "utilzied" and substitute --utilized--;

In column 3, line 65, delete "preferrably" and substitute --preferably--;

In column 4, line 27, delete "asserted" and substitute --inserted--;

In Claim 1, column 7, line 9, after "gears such that" insert --said--;

In Claim 4, column 8, line 15, delete "too" and substitute --to--.

Signed and Sealed this

Twenty-fifth Day of June 1985

[SEAL]

Attest:

DONALD J. QUIGG

Attesting Officer

Acting Commissioner of Patents and Trademarks